US009822716B2

United States Patent
Bird

(10) Patent No.: US 9,822,716 B2
(45) Date of Patent: Nov. 21, 2017

(54) VEHICLE ENGINE AIR SUPPLY CONDENSATION CONTROL

(71) Applicant: JAGUAR LAND ROVER LIMITED, Warwickshire (GB)

(72) Inventor: Rob Bird, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 110 days.

(21) Appl. No.: 14/767,926

(22) PCT Filed: Feb. 12, 2014

(86) PCT No.: PCT/EP2014/052723
§ 371 (c)(1),
(2) Date: Aug. 14, 2015

(87) PCT Pub. No.: WO2014/124965
PCT Pub. Date: Aug. 21, 2014

(65) Prior Publication Data
US 2016/0003174 A1    Jan. 7, 2016

(30) Foreign Application Priority Data
Feb. 15, 2013    (GB) .................................. 1302635.6

(51) Int. Cl.
*F02B 29/04*    (2006.01)
*F02D 41/00*    (2006.01)
(Continued)

(52) U.S. Cl.
CPC .......... *F02D 41/0002* (2013.01); *B60K 13/02* (2013.01); *F02B 29/0406* (2013.01);
(Continued)

(58) Field of Classification Search
CPC ............... F02D 41/0002; F02D 41/021; F02B 29/0406; F02B 29/0493; F02B 29/0418; B60K 13/02; Y02T 10/146
(Continued)

(56) References Cited

U.S. PATENT DOCUMENTS 6,067,808 A    5/2000    Dage
9,032,939 B2 *    5/2015    Glugla ................ F02D 41/0002
                                                            123/540
(Continued)

FOREIGN PATENT DOCUMENTS

CN        101389839 A        3/2009
DE    102008009152 A1        8/2009
(Continued)

OTHER PUBLICATIONS

Combined Search and Examination Report under Sections 17 and 18(3) for Application No. GB1302635.6 dated Jun. 12, 2013.
(Continued)

*Primary Examiner* — Marguerite McMahon
(74) *Attorney, Agent, or Firm* — Carlson, Gaskey & Olds

(57) ABSTRACT

A system for controlling condensation associated with a vehicle engine air supply includes a shutter assembly configured to selectively allow airflow through the shutter assembly. An air supply cooler is configured to provide intake air to an engine. The air supply cooler is situated near the shutter assembly such that air flowing through the shutter assembly is incident on an exterior of the air supply cooler. A controller determines when at least one condition exists that is conducive to condensation within the air supply cooler and controls the shutter assembly to alter an amount of air incident on the exterior of the air supply cooler for controlling condensation in the air supply cooler.

17 Claims, 4 Drawing Sheets

(51) Int. Cl.
  *B60K 13/02* (2006.01)
  *F02D 41/02* (2006.01)
(52) U.S. Cl.
  CPC ...... *F02B 29/0418* (2013.01); *F02B 29/0493* (2013.01); *F02D 41/021* (2013.01); *Y02T 10/146* (2013.01)
(58) Field of Classification Search
  USPC .................................................. 123/542, 563
  See application file for complete search history.

(56) References Cited

U.S. PATENT DOCUMENTS

| | | | |
|---|---|---|---|
| 2002/0073977 A1 | 6/2002 | Craig et al. | |
| 2002/0195090 A1 | 12/2002 | Marsh et al. | |
| 2009/0050117 A1* | 2/2009 | Tai | F02B 29/0412 123/542 |
| 2014/0048048 A1* | 2/2014 | Glugla | F02D 41/0002 123/542 |
| 2014/0048049 A1* | 2/2014 | Glugla | F02B 29/0418 123/563 |
| 2014/0075976 A1* | 3/2014 | Glugla | F02B 29/0418 62/150 |
| 2014/0109880 A1* | 4/2014 | Styles | F02B 29/04 123/542 |
| 2014/0150756 A1* | 6/2014 | Smith | F02M 31/205 123/563 |
| 2014/0165961 A1* | 6/2014 | Patel | F02M 35/10255 123/337 |

FOREIGN PATENT DOCUMENTS

| | | |
|---|---|---|
| DE | 102009036745 A1 | 2/2011 |
| EP | 1217188 A2 | 6/2002 |
| FR | 2942748 A1 | 9/2010 |
| JP | H04334724 A | 11/1992 |
| JP | 2013036452 A | 2/2013 |

OTHER PUBLICATIONS

International Search Report for International Application No. PCT/EP2014/052723 dated May 26, 2014.
Patent Office of the People's Republic of China, First Search Report for Application No. 201480022003.3 dated Jan. 22, 2017.

* cited by examiner

VEHICLE ENGINE AIR SUPPLY CONDENSATION CONTROL

TECHNICAL FIELD

The subject matter of this application generally relates to controlling vehicle engine performance. More particularly, but not exclusively, the subject matter of this application relates to control of condensation associated with a vehicle engine air supply. Aspects of the invention relate to a system, to a method and to a vehicle.

BACKGROUND

Modern automobiles include various controls for ensuring a desired driving experience. Vehicle owners have come to expect reliable and consistent performance from their vehicles. There may be conditions, however, in which the vehicle or engine performance varies from an expected performance profile. Vehicle designers and manufacturers strive to avoid the effect of such conditions. In some cases particular control strategies need to be implemented to address such conditions.

SUMMARY

According to an embodiment, a system for controlling condensation associated with a vehicle engine air supply includes a shutter assembly configured to selectively allow airflow through the shutter assembly. An air supply cooler is configured to provide intake air to an engine. The air supply cooler is situated near the shutter assembly such that air flowing through the shutter assembly is incident on an exterior of the air supply cooler. A controller determines when at least one condition exists that is conducive to condensation within the air supply cooler and controls the shutter assembly to alter an amount of air incident on the exterior of the air supply cooler for controlling condensation in the air supply cooler.

In an embodiment having one or more features of the system of the preceding paragraph, the controller is configured to determine when the at least one condition exists by determining a condensation temperature range based on at least an ambient air temperature and an ambient air pressure and determining whether an intake air temperature is within the condensation temperature range.

In an embodiment having one or more features of the system of any of the preceding paragraphs, the controller is configured to control the shutter assembly to raise the intake air temperature to a temperature above an upper limit of the condensation range by reducing an amount of air incident on the exterior of the air supply cooler when the condition exists.

In an embodiment having one or more features of the system of any of the preceding paragraphs, the controller is configured to determine when the at least one condition exists by determining a condensation temperature threshold based on at least an ambient air temperature and an ambient air pressure and determining whether an intake air temperature is below the condensation temperature threshold.

In an embodiment having one or more features of the system of any of the preceding paragraphs, the controller controls the shutter assembly to reduce an amount of cooling of the intake air within the air supply cooler when the at least one condition exists.

In an embodiment having one or more features of the system of any of the preceding paragraphs, the controller is configured to at least temporarily close the shutter assembly when the at least one condition exists.

In an embodiment having one or more features of the system of any of the preceding paragraphs, the controller is configured to determine whether the at least one condition exists by determining whether moisture is present in ambient air based on at least one indicator.

In an embodiment having one or more features of the system of any of the preceding paragraphs, the at least one indicator comprises an indication that vehicle windscreen wipers are on.

In an embodiment having one or more features of the system of any of the preceding paragraphs, the controller is configured to determine whether a vehicle speed is within a speed range conducive to condensation; determine whether an ambient temperature is within an ambient range conducive to condensation; determine whether an ambient pressure is within a pressure range conducive to condensation; determine whether there is moisture in ambient air; determine whether an engine operating condition requires a setting of the shutter assembly; determine whether the at least one condition exists when the vehicle speed in within the speed range, the ambient temperature is within the ambient range, the ambient pressure is within the pressure range, and there is moisture in the ambient air; and control the shutter assembly for controlling condensation in the air supply cooler when the at least one condition exists and the engine operating condition does not require a setting of the shutter assembly.

According to an embodiment, a method of controlling condensation associated with a vehicle engine air supply includes determining when at least one condition exists that is conducive to condensation within an air supply cooler that is configured to provide intake air to an engine. When the at least one condition exists, a shutter assembly is controlled to alter an amount of air incident on an exterior of the air supply cooler for controlling condensation in the air supply cooler.

In an embodiment including one or more features of the method of the preceding paragraph, determining whether the at least one condition exists comprises determining a condensation temperature range based on at least an ambient air temperature and an ambient air pressure; and determining whether an intake air temperature is within the condensation temperature range.

An embodiment including one or more features of the method of any of the preceding paragraphs includes controlling the shutter assembly to raise the intake air temperature to a temperature above an upper limit of the condensation range by reducing an amount of air incident on the exterior of the air supply cooler when the condition exists.

In an embodiment including one or more features of the method of any of the preceding paragraphs, determining whether the at least one condition exists comprises determining a condensation temperature threshold based on at least an ambient air temperature and an ambient air pressure; and determining whether an intake air temperature is below the condensation temperature threshold.

An embodiment including one or more features of the method of any of the preceding paragraphs includes controlling the shutter assembly to reduce an amount of cooling of the intake air within the air supply cooler when the at least one condition exists.

An embodiment including one or more features of the method of any of the preceding paragraphs includes at least temporarily closing the shutter assembly when the at least one condition exists.

In an embodiment including one or more features of the method of any of the preceding paragraphs, determining whether the at least one condition exists comprises determining whether moisture is present in ambient air based on at least one indicator.

In an embodiment including one or more features of the method of any of the preceding paragraphs, the at least one indicator comprises an indication that vehicle windscreen wipers are on.

An embodiment including one or more features of the method of any of the preceding paragraphs includes determining whether a vehicle speed is within a speed range conducive to condensation; determining whether an ambient temperature is within an ambient range conducive to condensation; determining whether an ambient pressure is within a pressure range conducive to condensation; determining whether there is moisture in ambient air; determining whether an engine operating condition requires a setting of the shutter assembly; determining whether the at least one condition exists when the vehicle speed in within the speed range, the ambient temperature is within the ambient range, the ambient pressure is within the pressure range, and there is moisture in the ambient air; and controlling the shutter assembly for controlling condensation in the air supply cooler when the at least one condition exists and the engine operating condition does not require a setting of the shutter assembly.

According to an embodiment, a vehicle includes an engine and an intake air supply cooler situated to provide cooled intake air to the engine. A shutter assembly is configured to selectively allow airflow through the shutter assembly. The shutter assembly is situated relative to the air supply cooler such that at least some of the airflow through the shutter assembly is incident on an exterior of the air supply cooler. A controller determines when at least one condition exists that is conducive to condensation within the air supply cooler and controls the shutter assembly to alter an amount of air incident on the exterior of the air supply cooler for controlling condensation in the air supply cooler.

In an embodiment including one or more features of the vehicle of the preceding paragraph, the controller is configured to determine when the at least one condition exists by determining a condensation temperature range based on at least an ambient air temperature and an ambient air pressure; and determining whether an intake air temperature is within the condensation temperature range.

In an embodiment including one or more features of the vehicle of any of the preceding paragraphs, the controller is configured to control the shutter assembly to raise the intake air temperature to a temperature above an upper limit of the condensation range by reducing an amount of air incident on the exterior of the air supply cooler when the condition exists.

In an embodiment including one or more features of the vehicle of any of the preceding paragraphs, the controller is configured to determine when the at least one condition exists by determining a condensation temperature threshold based on at least an ambient air temperature and an ambient air pressure; and determining whether an intake air temperature is below the condensation temperature threshold.

In an embodiment including one or more features of the vehicle of any of the preceding paragraphs, the shutter assembly comprises a plurality of shutter members that are selectively moveable between an open and a closed position; and the controller controls a position of the shutter members to at least temporarily reduce an amount of air incident on the air supply cooler for reducing cooling of the intake air within the air supply cooler when the at least one condition exists.

An embodiment including one or more features of the vehicle of any of the preceding paragraphs includes windscreen wipers and the controller is configured to determine whether the at least one condition based on an operating condition of the windscreen wipers as an indication of whether moisture is present in ambient air.

In an embodiment including one or more features of the vehicle of any of the preceding paragraphs, the controller is configured to determine whether a vehicle speed is within a speed range conducive to condensation; determine whether an ambient temperature is within an ambient range conducive to condensation; determine whether an ambient pressure is within a pressure range conducive to condensation; determine whether there is moisture in ambient air; determine whether an engine operating condition requires a setting of the shutter assembly; determine whether the at least one condition exists when the vehicle speed in within the speed range, the ambient temperature is within the ambient range, the ambient pressure is within the pressure range, and there is moisture in the ambient air; and control the shutter assembly for controlling condensation in the air supply cooler when the at least one condition exists and the engine operating condition does not require a setting of the shutter assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

One or more embodiments of the present invention will now be described, by way of example only, with reference to the accompanying drawings, which can be briefly described as follows.

DETAILED DESCRIPTION

Figure 1:
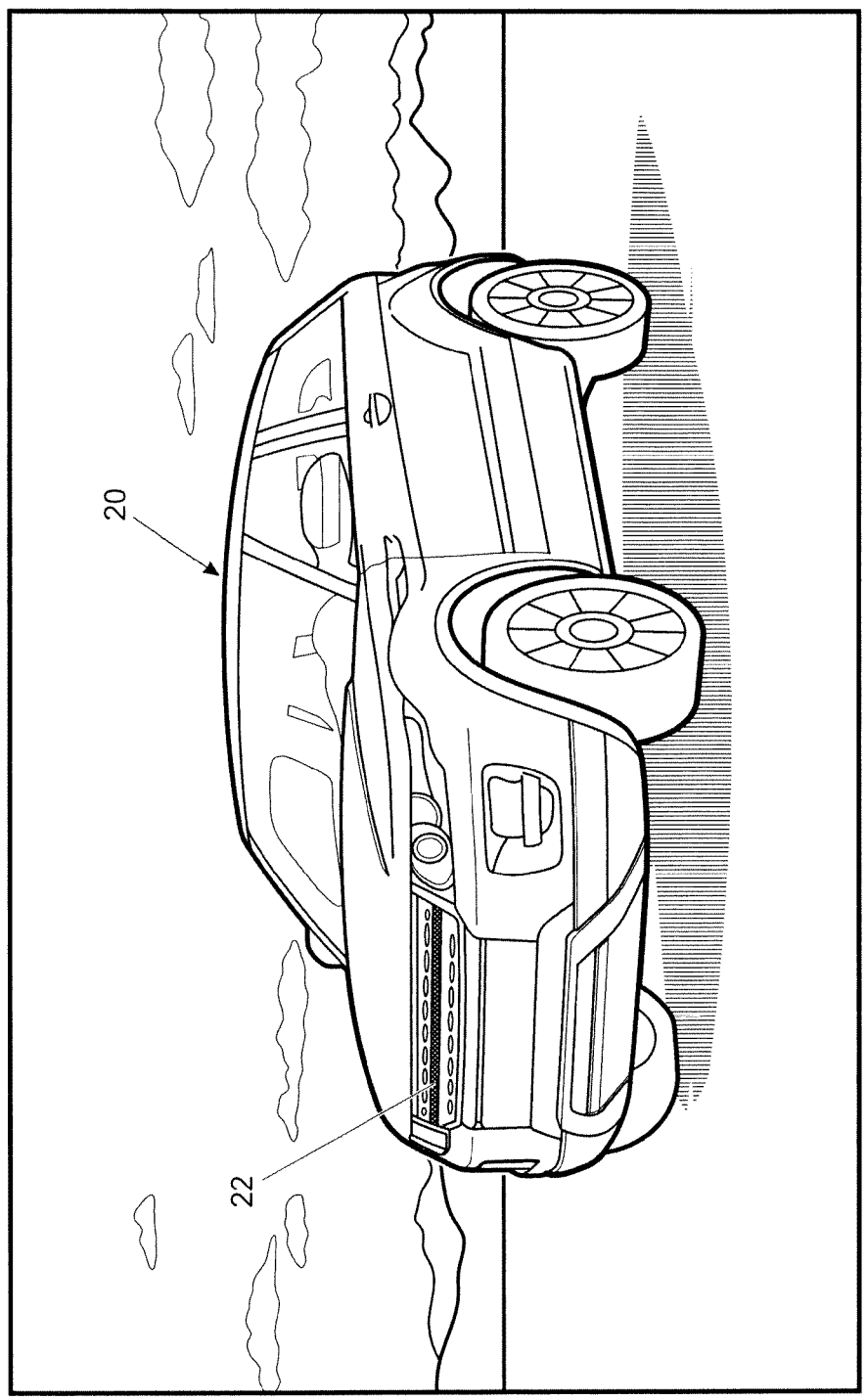
FIG. 1 diagrammatically illustrates a vehicle that includes a system for controlling condensation associated with an engine cooler of the vehicle according to an embodiment of this invention.
Figure 2:
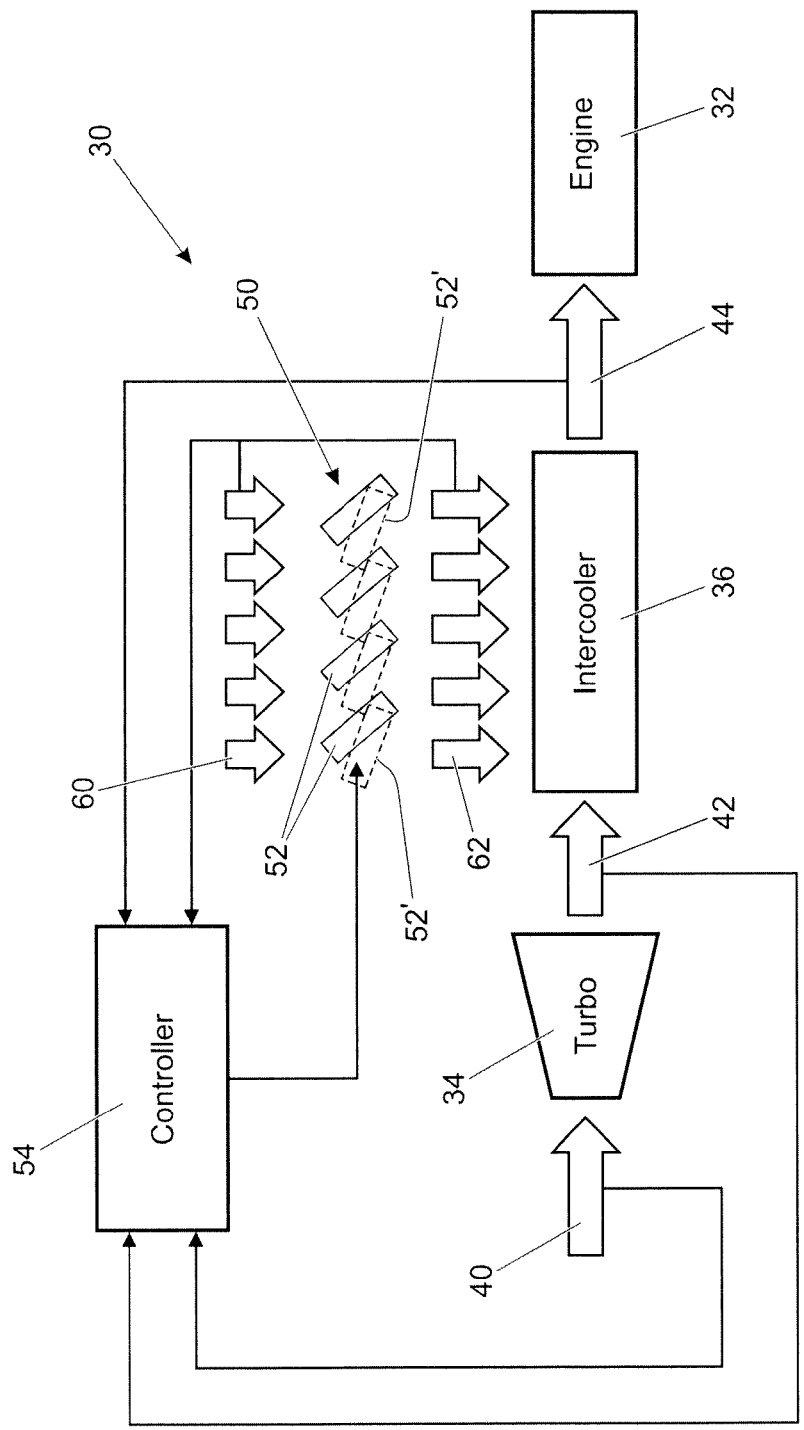
FIG. 2 schematically illustrates an example system for controlling condensation associated with an engine air supply according to an embodiment of this invention.

FIG. 1 shows a vehicle 20 that includes a grille 22 through which air may flow to provide cooling for various purposes. FIG. 2 schematically illustrates a system 30 for controlling how airflow through the grille 22 may influence operation of a vehicle engine 32. An engine intake air supply in this example includes a compressor or turbo booster 34 and an air supply cooler 36, which is configured as an intercooler useful with a turbo engine configuration in the illustrated example.

Air schematically shown at 40 enters the turbo booster 34 where it is compressed. Air schematically shown at 42 exits the turbo booster with at a higher pressure and a higher temperature compared to the air at 40. The air 42 is cooled by the air supply cooler 36 and provided as intake air to the engine 32.

The illustrated system 30 includes a shutter assembly 50 associated with the grille 22. The shutter assembly 50 includes a plurality of moveable shutter members 52 that are selectively positioned in a variety of positions between an open position and a closed position. FIG. 2 shows the shutter members 52 in an at least partially open position. The position shown in phantom at 52' corresponds to a closed position. When the shutter members 52 are in a closed position the amount of airflow through the grille 22 is at least significantly restricted and, in at least some embodiments, completely blocked.

There are known grille shutter arrangements and some example embodiments the shutter assembly 50 has such a known configuration. The manner in which the shutter assembly 50 is used within any of the embodiments of this description, however, is different than how any known shutter assemblies previously may have been used.

A controller 54 controls the shutter assembly 50 to control an amount of ambient air represented by the arrows 60 that passes through the shutter assembly 50. The controller 54 thereby controls an amount of air represented by the arrows 62 that is incident on an exterior of the air supply cooler 36. The amount of air 62 influences the cooling capacity of the air supply cooler 36.

The controller 54 is configured to control condensation within the air supply cooler 36. The controller 54 may be configured in this way by being provided with appropriate hardware, firmware, software or a combination of them. The controller 54 determines when conditions that are conducive to potential condensation exist and controls the shutter assembly to alter a cooling performance of the air supply cooler and a temperature of the intake air provided to the engine. There are conditions conducive to condensation within the air supply cooler 36 that may result in moisture or condensation droplets within the intake air supplied to the engine 32 that may adversely affect engine performance. The controller 54 controls the shutter assembly 50 to at least reduce and in some cases eliminate condensation so that any moisture in the intake air provided to the engine 32 remains in a desirable range that corresponds to desired engine performance.

Figure 3:
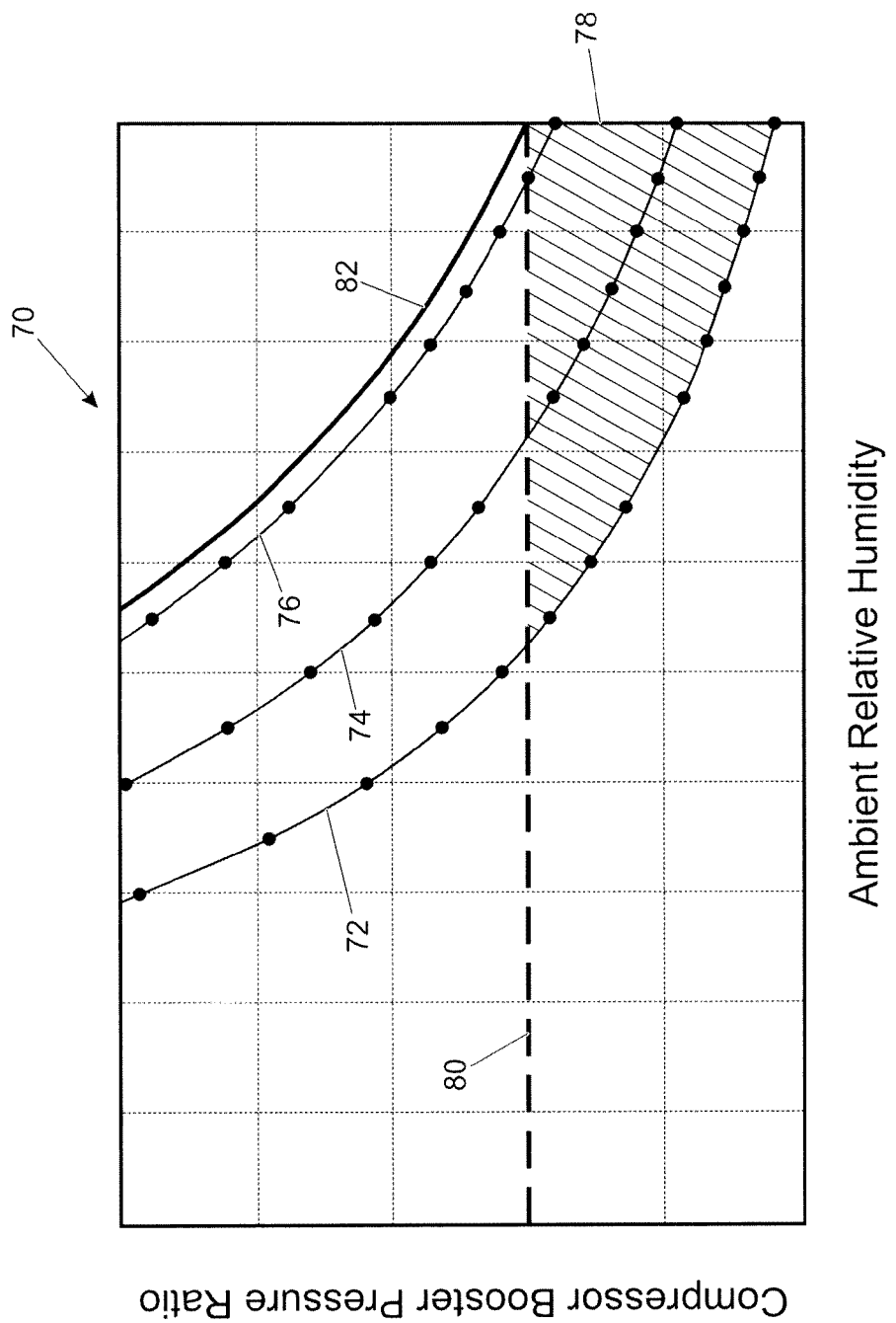
FIG. 3 is a graphical representation of an example approach for controlling condensation associated with an engine air supply according to an embodiment of this invention.

One aspect of the disclosed example embodiment is that it includes the discovery of the conditions that are conducive to condensation in the air supply cooler 36. FIG. 3 includes a graphical illustration 70 that shows a way of determining when at least one condition conducive to condensation exists. FIG. 3 shows a relationship between a compressor booster pressure ratio and ambient relative humidity for a given ambient temperature. A first curve 72 represents the relationship of FIG. 3 when the intake air temperature exiting the air supply cooler is a first temperature. The curve 74 represents that relationship for a second, higher intake air temperature and the curve 76 represents that relationship for a third, still higher intake air temperature.

The conditions shown in FIG. 3 within a range represented by the shaded region 78 correspond to a condition that is conducive to condensation within the air supply cooler 36. In FIG. 3, the value of the booster pressure ratio shown at 80 corresponds to one threshold factor affecting whether condensation is likely. In one example, the value at 80 corresponds to a maximum expected booster pressure ratio for a particular engine operating in a particular geographical region.

As can be appreciated from the illustration, there is a range of humidity levels for which there is no concern with potential condensation in the engine air supply system. As the humidity increases, however, it is possible for condensation to form at certain intake air temperatures within the air supply cooler 36. The curve 72, which corresponds to the lowest intake air temperature shown in FIG. 3, has a larger range of humidity and boost pressure ratio values that result in potential condensation. As the intake air temperature increases the range within which condensation is likely decreases as can be appreciated by comparing the amount of the region 78 above the curves 74 and 76, respectively.

In at least one embodiment, given the booster pressure ratio threshold shown at 80 and the region 78, it is possible to set an intake air temperature threshold above which condensation is not likely. The example of FIG. 3 includes such a temperature threshold corresponding to the curve 82. The controller 54 controls the shutter assembly 50 to adjust a cooling capacity of the air supply cooler 36 to maintain the intake air temperature at or above the threshold temperature corresponding to the curve 82 to control condensation formation within the air supply system.

As schematically shown in FIG. 2, the controller 54 receives indications of one or more of temperature, pressure, and humidity from sensors (not illustrated) that provide such indications regarding the air at 40, 42 and 44. In the illustrated example, the controller 54 also receives such information regarding the air at 60 and 62. In one example, the controller 54 uses information regarding at least the temperature and pressure of the ambient air and the temperature of the intake air exiting the air supply cooler 36 to determine whether at least one condition exists that is conducive to condensation. For example, given the ambient temperature and pressure, the controller 54 determines an intake air range that is conducive to condensation. If the intake air temperature is in that range, the controller 54 controls the shutter assembly 50 to alter the intake air temperature until the intake air temperature is outside of the determined range. Closing the shutter members 52 reduces the cooling capacity of the air supply cooler 36 and that results in an increase in the intake air temperature. In one example, the controller 54 maintains the shutter members 52 in a closed or at least partially closed position as long as the condition conducive to condensation exists. Once the potential for condensation has passed, the controller 54 utilizes a different strategy for controlling the shutter assembly 50 depending on engine operating conditions, for example.

One example embodiment includes the controller 54 determining a threshold intake air temperature for a current ambient air temperature and pressure. The controller 54 in such an example controls the shutter assembly 50 to maintain the intake air temperature above that threshold. One such example includes providing the controller 54 with a predetermined set of threshold values for a plurality of ambient temperature and pressure combinations, respectively. Table 1 below represents one example set of such values. For example, the threshold intake air temperature when the ambient pressure is approximately 80 kPa and the ambient temperature is approximately 10° C., the threshold temperature is about 20° C. The controller 54 in one example includes a look up table corresponding to values like those shown in Table 1 and uses them for determining an appropriate threshold and uses that for determining whether shutter assembly control is required for condensation control.

TABLE 1

| | | Ambient Temperature (° C.) | | | | | | |
|---|---|---|---|---|---|---|---|---|
| | | −30 | 0 | 10 | 20 | 30 | 40 | 50 |
| Ambient Pressure (kPa) | 50 | −5 | 25 | 35 | 45 | 55 | 65 | 75 |
| | 60 | −10 | 20 | 30 | 40 | 50 | 60 | 70 |
| | 70 | −15 | 15 | 25 | 35 | 45 | 55 | 65 |
| | 80 | −20 | 10 | 20 | 30 | 40 | 50 | 60 |
| | 90 | −20 | 10 | 20 | 30 | 40 | 50 | 60 |
| | 100 | −20 | 10 | 20 | 30 | 40 | 50 | 60 |
| | 110 | −20 | 10 | 20 | 30 | 40 | 50 | 60 |

Figure 4:
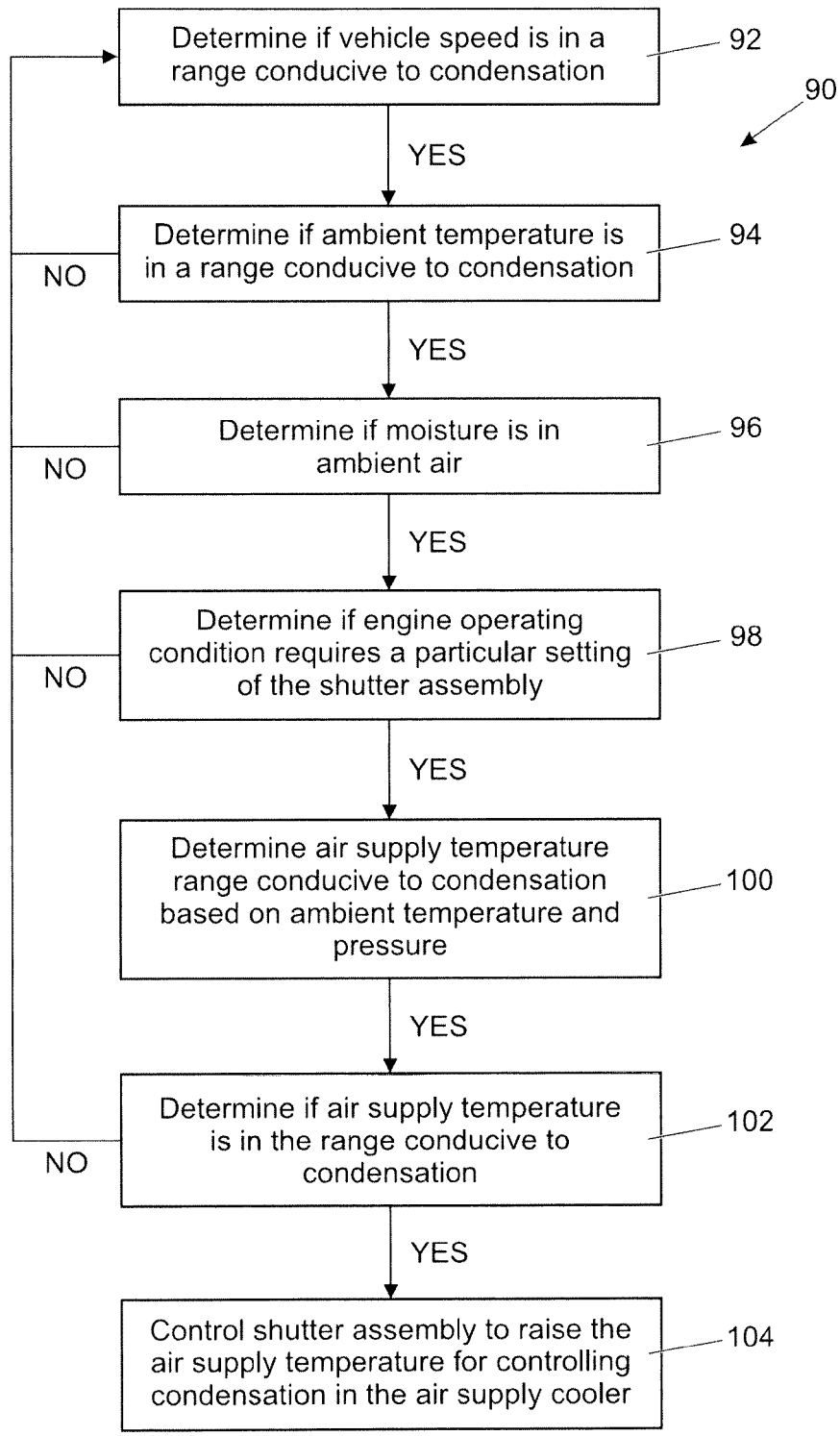
FIG. 4 is a flowchart diagram summarizing an example approach for controlling condensation associated with an engine air supply according to an embodiment of this invention.

Some embodiments include additional factors that are considered by the controller 54 for determining whether the shutter assembly 50 should be controlled for reducing or avoiding condensation in the intake air provided to the engine 32. FIG. 4 is a flowchart diagram 90 that summarizes one example approach. At 92, the controller determines whether the vehicle is moving at a speed that corresponds to a possibility for condensation in the air supply cooler 36. If so, the controller determines at 94 whether the ambient temperature is in a range conducive to condensation. If the ambient temperature is in such a range, the controller 54 determines at 96 whether there is moisture in the ambient air. In one example, the controller uses information regarding vehicle windscreen wiper operation as an indication of whether there is moisture in the ambient air. For example, when it is raining or the pavement is wet, it is likely that the driver will require the windscreen wipers to be on and the controller 54 in one example uses that as an indication that there is moisture in the air, which corresponds to a condition conducive to condensation.

One reason for considering whether there is moisture in the air incident on the air supply cooler 36 is that moist air or water present in that air may significantly increase the cooling capacity of the cooler 36. Increased cooling capacity may contribute to condensation formation.

In some cases, the engine operating condition will require a certain amount of cooling that requires the shutter members 52 to be open to a certain extent. The example of FIG. 4 includes a determination at 98 whether such an engine operating condition exists. If so, the controller 54 in this example will not proceed to control the shutter assembly 50 for condensation control.

If, however, there is no such engine operation condition, the controller 54 determines at 100 an intake air temperature range that is conducive to condensation for the current ambient air temperature and pressure. The range may have upper and lower limits or may include only an upper threshold limit above which there is no concern or at least a reduced concern with the possibility of condensation in the intake air. The controller 54 determines at 102 whether the intake air temperature is in the determined range. If so, at 104 the controller 54 controls the shutter assembly 50 to raise the intake air temperature to control condensation in the intake air supply.

The values of vehicle speed, ambient air temperature and pressure and intake air temperature that are conducive to undesirable condensation may vary for different vehicles and different geographic regions. Given this description, those skilled in the art will realize what parameters are necessary for controlling condensation for their particular implementation.

The examples described above provide the ability to control condensation in an air supply cooler for controlling a moisture content of intake air supplied to a vehicle engine in a manner that facilitates desired engine operation even under conditions that are conducive to such condensation. The described examples may reduce or even eliminate such condensation.

While various features and aspects are described above in connection with one or more particular example embodiments, those features and aspects are not necessarily exclusive to the corresponding embodiment. The disclosed features and aspects may be combined in other ways than those specifically mentioned above. In other words, any feature of one embodiment may be included with or substituted for a feature of another embodiment.

The preceding description is illustrative rather than limiting in nature. Variations and modifications to the disclosed examples may become apparent to those skilled in the art that do not necessarily depart from the contribution to the art provided by the disclosed examples. The scope of legal protection provided to the invention can only be determined by studying the following claims in which it is intended that each dependent claim can be combined with any other dependent or independent claim either alone or in combination.

The invention claimed is:

1. A system for controlling condensation associated with a vehicle engine air supply, comprising:
   a shutter assembly configured to selectively allow airflow therethrough;
   an air supply cooler configured to provide intake air to an engine, the air supply cooler being situated relative to the shutter assembly such that air flowing through the shutter assembly is incident on an exterior of the air supply cooler; and
   a controller that is configured to:
      determine, when in use, whether a vehicle speed is within a speed range conducive to condensation;
      determine whether an ambient temperature is within an ambient range conducive to condensation;
      determine whether an ambient pressure is within a pressure range conducive to condensation;
      determine whether there is moisture in the ambient air;
      determine whether an engine operating condition requires a setting of the shutter assembly for an amount of cooling for the engine operating condition; and
      determine whether at least one condition that is conducive to condensation within the air supply cooler exists when the vehicle speed is within the speed range, the ambient temperature is within the ambient range, the ambient pressure is within the pressure range, and there is moisture in the ambient air;
   wherein the controller is configured to determine when the at least one condition exists by:
      determining a condensation temperature range based on at least the ambient air temperature and the ambient air pressure; and
      determining whether an intake air temperature is within the condensation temperature range; and
   wherein the controller is configured to control the shutter assembly to alter an amount of air incident on the exterior of the air supply cooler for controlling condensation in the air supply cooler only when the at least one condition that is conducive to condensation within the air supply cooler exists and the engine operating condition does not require the setting of the shutter assembly.

2. The system of claim 1, wherein the controller is configured to control the shutter assembly to raise the intake air temperature to a temperature above an upper limit of the condensation range by reducing an amount of air incident on the exterior of the air supply cooler when the condition exists.

3. The system of claim 1, wherein the controller controls the shutter assembly to reduce an amount of cooling of the intake air within the air supply cooler when the at least one condition exists.

4. The system of claim 3, wherein the controller is configured to at least temporarily close the shutter assembly when the at least one condition exists.

5. The system of claim 1, wherein the controller is configured to determine whether the at least one condition exists by determining whether moisture is present in ambient air based on at least one indicator.

6. The system of claim 5, wherein the at least one indicator comprises an indication that vehicle windscreen wipers are on.

7. A method of controlling condensation associated with a vehicle engine air supply including an air supply cooler that is configured to provide intake air to an engine, the method comprising the steps of:
   determining whether a vehicle speed is within a speed range conducive to condensation;
   determining whether an ambient temperature is within an ambient range conducive to condensation;
   determining whether an ambient pressure is within a pressure range conducive to condensation;
   determining whether there is moisture in the ambient air;
   determining whether an engine operating condition requires a setting of the shutter assembly for an amount of cooling for the engine operating condition; and
   determining whether at least one condition that is conducive to condensation within the air supply cooler exists when the vehicle speed is within the speed range, the ambient temperature is within the ambient range, the ambient pressure is within the pressure range, and there is moisture in the ambient air;
   wherein determining whether the at least one condition exists comprises:
   determining a condensation temperature range based on at least the ambient air temperature and the ambient air pressure; and
   determining whether an intake air temperature is within the condensation temperature range; and
   wherein the method comprises controlling the shutter assembly to alter an amount of air incident on an exterior of the air supply cooler for controlling condensation in the air supply cooler only when the at least one condition that is conducive to condensation within the air supply cooler exists and the engine operating condition does not require the setting of the shutter assembly.

8. The method of claim 7, comprising controlling the shutter assembly to raise the intake air temperature to a temperature above an upper limit of the condensation range by reducing an amount of air incident on the exterior of the air supply cooler when the condition exists.

9. The method of claim 7, comprising controlling the shutter assembly to reduce an amount of cooling of the intake air within the air supply cooler when the at least one condition exists.

10. The method of claim 7, comprising at least temporarily closing the shutter assembly when the at least one condition exists.

11. The method of claim 7, wherein determining whether the at least one condition exists comprises determining whether moisture is present in ambient air based on at least one indicator.

12. The method of claim 11, wherein the at least one indicator comprises an indication that vehicle windscreen wipers are on.

13. A vehicle, comprising:
   an engine;
   an intake air supply cooler situated to provide cooled intake air to the engine;
   a shutter assembly configured to selectively allow airflow through the shutter assembly, the shutter assembly being situated relative to the air supply cooler such that at least some of the airflow through the shutter assembly is incident on an exterior of the air supply cooler; and
   a controller configured to:
      determine, when in use, whether a vehicle speed is within a speed range conducive to condensation;
      determine whether an ambient temperature is within an ambient range conducive to condensation;
      determine whether an ambient pressure is within a pressure range conducive to condensation;
      determine whether there is moisture in the ambient air;
      determine whether an engine operating condition requires a setting of the shutter assembly for an amount of cooling for the engine operating condition; and
      determine whether at least one condition that is conducive to condensation within the air supply cooler exists when the vehicle speed is within the speed range, the ambient temperature is within the ambient range, the ambient pressure is within the pressure range, and there is moisture in the ambient air;
   wherein the controller is configured to determine when the at least one condition exists by:
      determining a condensation temperature range based on at least the ambient air temperature and the ambient air pressure; and
      determining whether an intake air temperature is within the condensation temperature range; and
   wherein the controller is configured to control the shutter assembly to alter an amount of air incident on the exterior of the air supply cooler for controlling condensation in the air supply cooler only when the at least one condition that is conducive to condensation within the air supply cooler exists and the engine operating condition does not require the setting of the shutter assembly.

14. The vehicle of claim 13, wherein the controller is configured to control the shutter assembly to raise the intake air temperature to a temperature above an upper limit of the condensation range by reducing an amount of air incident on the exterior of the air supply cooler when the condition exists.

15. The vehicle of claim 13, wherein:
   the shutter assembly comprises a plurality of shutter members that are selectively moveable between an open and a closed position.

16. The vehicle of claim 15, wherein the controller controls a position of the shutter members to at least temporarily reduce an amount of air incident on the air supply cooler for reducing cooling of the intake air within the air supply cooler when the at least one condition exists.

17. The vehicle of claim 13, comprising windscreen wipers and wherein the controller is configured to determine whether the at least one condition based on an operating condition of the windscreen wipers as an indication of whether moisture is present in ambient air.

* * * * *